(No Model.) 2 Sheets—Sheet 1.

G. W. HODGES.
CARVING MACHINE.

No. 558,951. Patented Apr. 28, 1896.

Witnesses:
Wm. W. Rheem
Wm. F. Henning

Inventor:
George W. Hodges
by Prevost & Darby
Att'ys (No Model.) 2 Sheets—Sheet 2.

G. W. HODGES.
CARVING MACHINE.

No. 558,951. Patented Apr. 28, 1896.

Witnesses

Inventor
George W. Hodges
by Mowat Darby
Atty's

UNITED STATES PATENT OFFICE.

GEORGE W. HODGES, OF CHICAGO, ILLINOIS.

CARVING-MACHINE.

SPECIFICATION forming part of Letters Patent No. 558,951, dated April 28, 1896.

Application filed November 16, 1895. Serial No. 569,218. (No model.)

*To all whom it may concern:*

Be it known that I, GEORGE W. HODGES, a citizen of the United States, residing at Chicago, in the county of Cook and State of Illinois, have invented a new and useful Carving-Machine, of which the following is a specification.

This invention relates to carving-machines, and particularly to machines for carving seats for ornamental figures in the sides of knife-handles.

The object of the invention is to provide a machine which is simple and effective, easily understood and operated, for forming seats for ornaments in the sides of knife-handles and similar articles.

The invention consists, substantially, in the construction, combination, location, and relative arrangement of parts, all as will be more fully hereinafter set forth, as shown in the accompanying drawings and finally pointed out in the appended claims.

Figure 1:
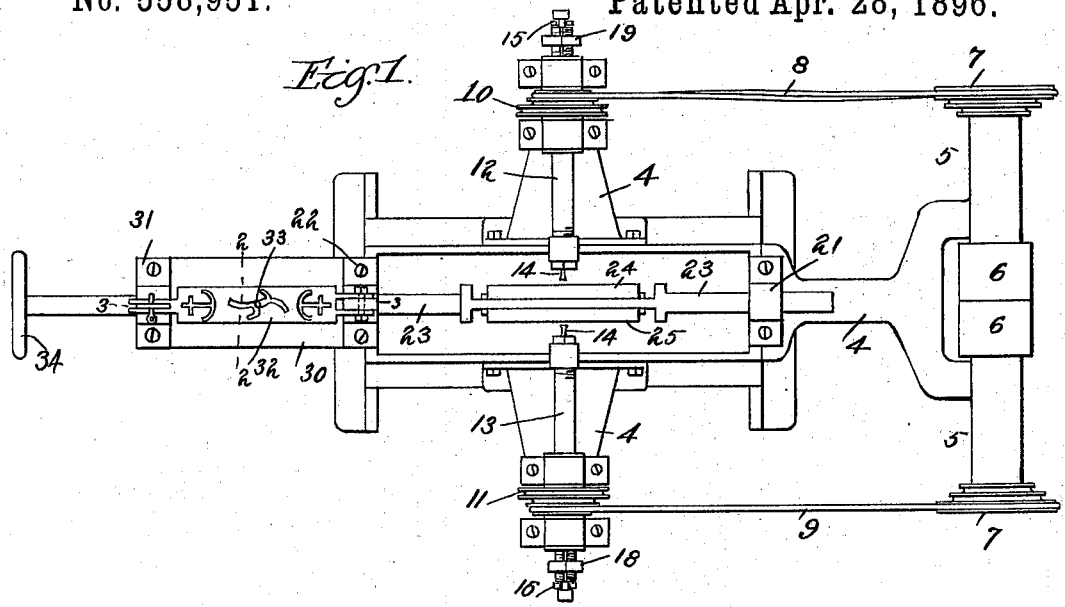
Figure 2:
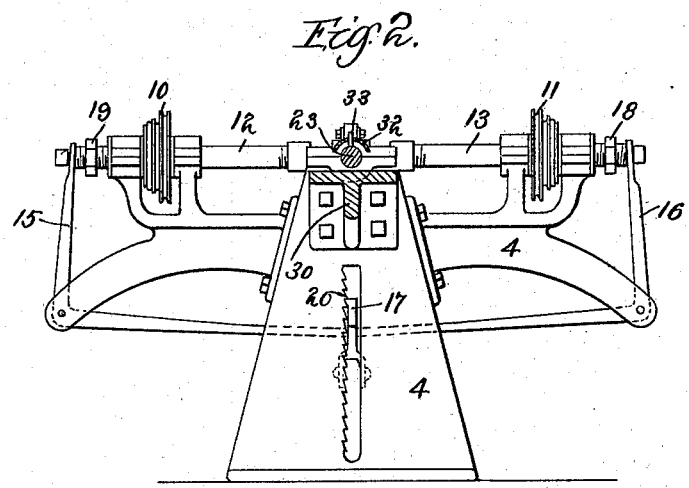
Figure 3:
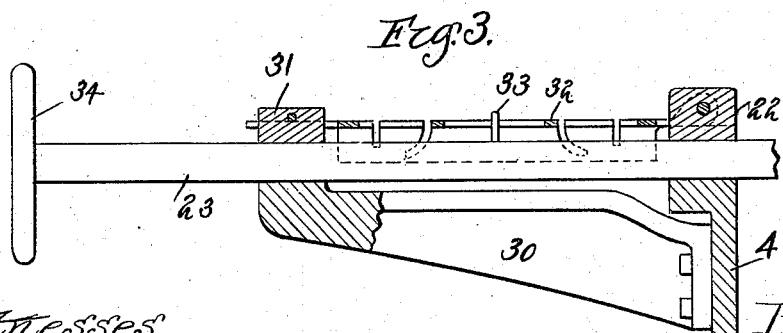
Figure 4:
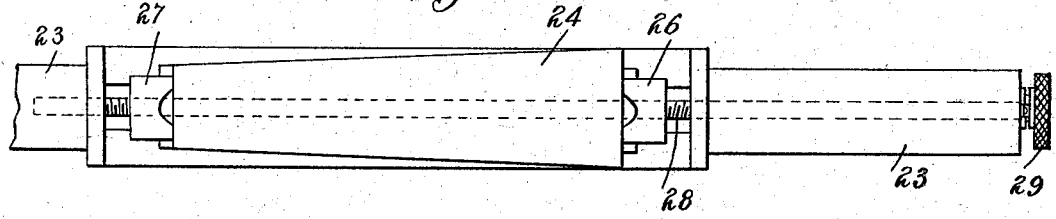
Figure 5:
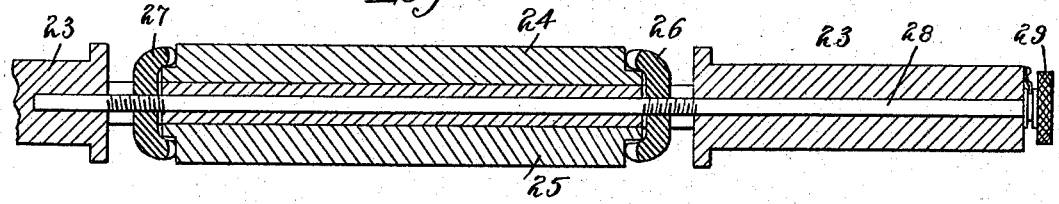
Figure 6:
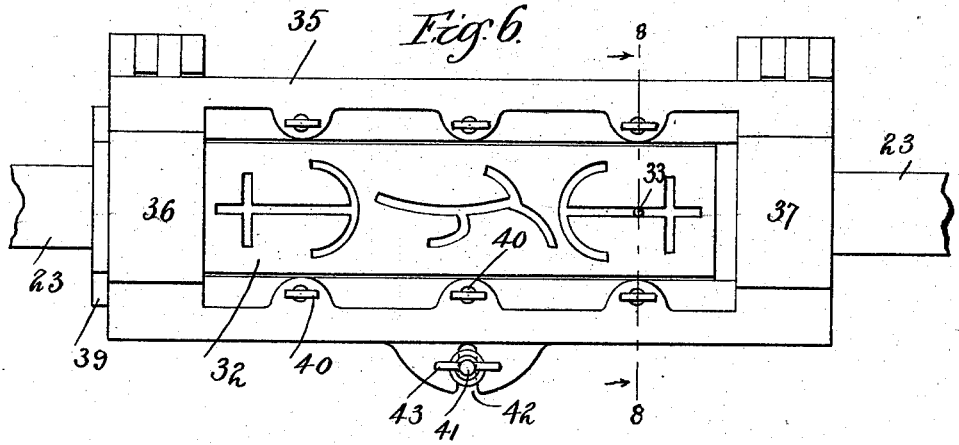
Figure 7:
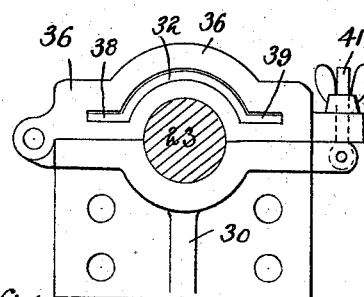
Figure 8:
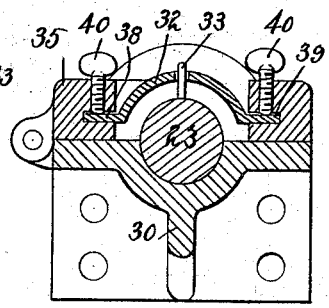

Referring to the accompanying sheet of drawings and to the various views and reference-signs appearing thereon, Figure 1 is a plan view of a machine embodying my invention. Fig. 2 is a sectional view of the same on the line 2 2, Fig. 1. Fig. 3 is an enlarged detail sectional view of a portion of the machine on the line 3 3, Fig. 1. Fig. 4 is a broken detail view in plan of the work-holder. Fig. 5 is a central longitudinal section of the same. Fig. 6 is a broken detail view in plan of a modified form of pattern which in many instances I prefer to use. Fig. 7 is an end view of the same, and Fig. 8 is a transverse sectional view of the same.

The same part is designated by the same reference-sign wherever it occurs.

I will now describe my invention as applied to forming seats for ornaments in knife or similar handles, though it will be evident that the principles of my invention may be applied for other purposes.

In the drawings, 4 designates a suitable framework, in which is journaled a shaft 5, adapted to be rotated from any suitable source of power through pulleys 6, one of which pulleys may be loose. Upon each end of shaft 6 is mounted a speed gear or pulley 7, each pulley 7 adapted to be geared in any suitable manner, as by crossed and open belts 8 9, with corresponding gears or pulleys 10 11, mounted, respectively, upon shafts 12 13. These shafts 12 13 are mounted to slide longitudinally through their bearings and their respective drive pulleys or gears, and they carry on the inner ends thereof the cutters or tools 14.

From the foregoing description it will be seen that when shaft 5 is rotated the shafts 12 and 13 are also rotated in opposite directions; but, as will be seen from the drawings, and as will be presently more fully described, since the work to be operated upon is between the cutter or tool carrying ends of shafts 12 13, and hence, as the cutters operate on opposite sides of the work-holder, it will be understood that the cutters revolve in the same direction with reference to the work-holder.

Each shaft 12 13 is arranged to be engaged by bell-crank or other suitable levers 15 16, respectively, and by means of a suitable treadle 17. Said levers may be rocked to move the shafts 12 13 longitudinally through their bearings to be advanced to or retracted from the work. The depth of cut may be readily regulated by adjusting the effective throw of levers 15 16, as by means of the adjustable nuts 18 19. A suitably-arranged rack, as 20, may be provided to hold treadle 17 in any desirable position to which it may be depressed, as will be readily understood.

I will now describe the work-holder and the manner of its manipulation, whereby any predetermined design may be carved in the work.

In suitable bearings 21 22 in the main frame 4, loosely mounted to rock and to slide longitudinally, is a spindle 23, upon opposite sides of which the sections of knife-handle 24 25 are mounted. In the particular form shown, to which, however, I do not desire to be limited, the spindle 23 is provided with flat sides, upon which the work to be operated upon is secured, and which are arranged in the space between bearings 21 22 and also between the adjacent or tool-carrying ends of the shafts 12 13.

In Figs. 4 and 5 I have shown a simple and efficient clamp for the work, wherein I provide clamping-jaws 26 27, oppositely faced and adapted to engage the respective ends of the work. A right and left screw-threaded rod 28 is arranged to pass longitudinally through spindle 23 and to actuate the clamping-jaws 26 27 toward and from each other to clamp or to release the work, said rod being actuated by any suitably or conveniently arranged thumb-nut 29. From this construction it will be seen that pieces of the material operated upon are firmly held and centered with reference to each other and to the cutting-tools.

In Figs. 1, 2, and 3 I have shown one form of arrangement of pattern wherein I provide a bracket 30, which may form part of or may be bolted to the main frame and in which is formed a bearing 31 for spindle 23. The pattern or templet plate 32, in which are formed the particular designs and outlines to be inlaid in the work, and the seats for which are adapted to be formed by the cutters, is pivoted at one end in bearing 22 and held at its opposite end in bearing 31. Of course this templet-plate may be permanently attached to or may form part of the cap-plates of bearings 22 31, and which cap-plates may be pivoted to rock on or swing laterally or to be removable, as will be readily seen. A pin 33, carried by spindle 23, is adapted to engage the pattern, as seen most clearly in Figs. 1, 2, and 3, and to follow the outline thereof as the operator grasps the hand-wheel 34 of the spindle and suitably rotates the same and moves the same longitudinally. The loose mounting of the spindle 23 permits of this operation.

It will be understood, of course, that the best results are secured when the templet or pattern plate is curved or cylindrical in outline to correspond with the outline of the work operated on, and also when the curvature of the templet-plate is on the same radius as the circumference of the work operated on.

It is important that the templet or pattern plate be held rigid against movement in order that the tools may make a smooth cut, and at the same time it is desirable to provide an arrangement whereby the guiding-pin 33 may be readily and quickly changed from one design or pattern of the pattern-plate to another or the pattern-plate itself removed or replaced by another.

I have shown in Figs. 6, 7, and 8 a construction whereby these results are accomplished, and wherein a frame 35 is formed with or carries the cap-pieces 36 37 of bearings 22 31, which cap-pieces are pivoted to the lower halves of said bearings, whereby the entire frame 35 may be rocked or swung up to uncover the spindle 23 or to free the pin 33 of said spindle from engagement with the pattern of the templet or pattern plate. The frame 35 is provided with side grooves or guides adapted to receive the side flanges 38 39 of the templet or pattern plate 32, the end cap-piece 36 being provided with a passage through which the pattern-plate may be passed endwise into the guide-grooves of frame 35. The set-screws 40 or other suitable devices may be provided to retain the pattern-plate in position. Any suitable form of lock or catch may be provided for locking frame 35 in closed position—as, for instance, a bolt 41, pivoted to the bracket 30 and adapted to enter an open-sided slot 42, formed in the frame 35, a set-nut 43, carried by said bolt, serving as the lock.

The operation of the machine is as follows: The work is mounted upon the work-holder and power is applied to rotate shafts 12 13. The pin 33 is arranged to engage the particular pattern of the pattern-plate which is to be cut. The treadle 17 is then depressed to advance the cutters to their work. When the desired depth of cut is attained, the operator grasps the handle-wheel 34 of the work-carrying spindle and moves said spindle, and hence also the work, in a direction for the pin 33 to follow the outlines of the pattern.

From the foregoing description it will be seen that the work is always revealed to the workman.

In the practical operation of my invention for knife-handle ornamentation it will be understood that the cutters form the seats in the handles to receive the ornaments, the knife-handle when completed presenting an inlaid surface. In this work it is important that the seats for the ornaments be so made as to retain the ornaments and prevent the same from becoming loose or detached. This purpose is accomplished in the construction above described by reason of the fact that the cutters always act in a right line in a horizontal plane with the center of the work, while the material operated on is rocked or rotated relative to the plane in which the cutters operate, thereby forming an undercut or dovetailed groove, which securely holds the ornament when it is inserted therein, and this I consider an important feature of my invention.

It will be seen that by arranging the work to be simultaneously operated upon by the cutters from opposite sides, and that by rotating the cutters in opposite directions with respect to each other, and hence in the same direction with reference to the line of cut in the material, said material is steadied by the action of the cutters and is thereby prevented from unduly vibrating during the cutting operation.

In case it is desired to operate on solid knife-handles it will be understood that the spindle 23 may be readily replaced by a suitable holder and a complete rotation of said spindle effected, if desired.

In the usual manner of forming seats for ornaments in knife-handles made in sections or halves, as heretofore practiced, it was customary for each section or half of the handle to be operated on separately. It will be seen that in my machine two sections or halves are simultaneously operated on, thereby doubling the amount of finished work of the operator.

No special care or attention is required to operate the machine, and hence unskilled workmen may be employed to manipulate the work-holder to cause the pin carried thereby to follow the outline of the pattern.

Many variations and changes in the construction, details, and arrangements of parts would readily suggest themselves to persons skilled in the art and still fall within the spirit and scope of my invention. While, therefore, I have shown and described a specific embodiment of my invention and have explained the construction and mode of operation thereof, I do not desire to be limited or restricted thereto; but

What I claim as new and of my own invention, and desire to secure by Letters Patent of the United States, is—

1. In a carving-machine, a longitudinally and rotarily movable work-holder, a rotary spindle arranged in a plane containing the axis of said holder and carrying a cutter, adapted to cut laterally, means for relatively moving said spindle and work-holder to cause said cutter to penetrate the work endwise, a pattern and a tracer, arranged to govern the rotary and longitudinal movements of the work, the one by the other; as and for the purpose set forth.

2. In a carving-machine, a longitudinally and rotarily movable work-holder, rotary spindles mounted on opposite sides thereof and in a plane containing the axis of said holder and carrying cutters adapted to cut laterally, means for relatively moving said spindle and work-holder, to cause said cutters to penetrate the work endwise, a pattern and a tracer arranged to govern the rotary and longitudinal movements of the work-holder, the one by the other; as and for the purpose set forth.

3. In a carving-machine, a longitudinally and rotarily movable work-holder, a rotary spindle arranged in a plane containing the axis of said work-holder and carrying a cutter adapted to cut laterally, means for advancing said spindle toward the work-holder, whereby said cutter is caused to penetrate the work endwise, a pattern and a tracer arranged to govern the rotary and longitudinal movements of the work, the one by the other; as and for the purpose set forth.

4. In a carving-machine, a longitudinally and rotarily movable work-holder, rotary spindles mounted on opposite sides thereof and in a plane containing the axis of said holder, and carrying cutters adapted to cut laterally, means for simultaneously advancing said spindles toward the work-holders, whereby the cutters carried thereby are caused to penetrate the work endwise, a pattern and a tracer arranged to govern the rotary and longitudinal movements of the work-holder; as and for the purpose set forth.

5. In a carving-machine, a longitudinally and rotarily movable work-holder, spindles mounted on opposite sides thereof and in a plane containing the axis of said work-holder, means for rotating said spindles in opposite directions, cutters carried by said spindles adapted to cut laterally, means for relatively moving said spindles and holder to cause said cutters to penetrate the work endwise, a pattern and a tracer arranged to govern the rotary and longitudinal movements of said holder, the one by the other; as and for the purpose set forth.

6. In a carving-machine, a longitudinally and rotarily movable work-holder, spindles mounted on opposite sides of said holder, and in a plane containing the axis of said holder, means for rotating said spindles in opposite directions cutters carried by said spindles adapted to cut laterally, means for advancing said spindles toward the work-holder, whereby said cutters are caused to penetrate the work endwise, a pattern and tracer arranged to govern the rotary and longitudinal movements of said holder, the one by the other; as and for the purpose set forth.

7. In a carving-machine, a longitudinally and rotarily movable work-holder, a rotary spindle arranged in the plane containing the axis of said holder, a laterally-operating cutter mounted thereon, means for advancing said spindle toward said holder, whereby said cutter is caused to penetrate the work endwise, means for retaining said spindle in advanced position, a pattern and a tracer arranged to govern the rotary and the longitudinal movements of the holder, the one by the other; as and for the purpose set forth.

8. In a carving-machine, a longitudinally and rotarily movable work-holder, a rotary spindle arranged in a plane containing the axis of said holder and carrying a cutter adapted to cut laterally, means for relatively moving said holder and spindle whereby said cutter is caused to penetrate the work endwise, a tracer carried by said holder, and a stationary pattern adapted to be engaged by said tracer to govern the rotary and longitudinal movements of said holder, the one by the other; as and for the purpose set forth.

9. In a carving-machine, a longitudinally and rotarily movable work-holder, a rotary spindle arranged in a plane containing the axis of said holder, and carrying a cutter adapted to cut laterally, means for relatively moving said holder and spindle whereby said cutter is caused to penetrate the work endwise, a tracer carried by said holder, a pivotally-mounted pattern adapted to be engaged by said tracer to govern the rotary and longitudinal movements of said holder; the one by the other; as and for the purpose set forth.

10. In a carving-machine, a longitudinally and rotarily movable work-holder, a rotary spindle arranged in a plane containing the axis of said holder, and carrying a cutter adapted to cut laterally, means for relatively moving said holder and spindle, whereby said cutter is caused to penetrate the work endwise, a tracer carried by said holder, a pivotally-mounted frame carrying a pattern, means for securing said frame in position to be engaged by said tracer, to govern the rotary and longitudinal movements of the work-holder, the one by the other; as and for the purpose set forth.

11. In a carving-machine, a longitudinally and rotarily movable work-holder, a rotary spindle arranged in a plane containing the axis of said holder, and carrying a cutter adapted to cut laterally, means for relatively moving said holder and spindle, whereby said cutter is caused to penetrate the work endwise, a tracer carried by said holder, a pivotally-mounted frame, a pattern removably mounted therein, means for securing said frame in position for the tracer to engage said pattern to govern the rotary and longitudinal movements of the holder, the one by the other; as and for the purpose set forth.

12. In a carving-machine, a longitudinally and rotarily movable work-holder, a rotary spindle arranged in a plane containing the axis of said holder, and carrying a cutter adapted to cut laterally, means for relatively moving said spindle and holder, whereby said cutter is caused to penetrate the work endwise, a tracer carried by said holder, a pivotally-mounted frame provided with ways, a pattern-plate provided with flanges adapted to be received in said ways, and means for securing said frame in position for the tracer to engage said pattern, whereby the rotary and longitudinal movements of said holder are governed, the one by the other; as and for the purpose set forth.

13. In a carving-machine, a longitudinally and rotarily movable work-holder, comprising oppositely-faced clamping-jaws, means for advancing and retracting said jaws toward and from each other, a rotary spindle arranged in a plane containing the axis of said holder and carrying a cutter adapted to cut laterally, means for relatively moving said spindle and holder, whereby said cutter is caused to penetrate the work endwise, a pattern and a tracer arranged to control the rotary and longitudinal movements of the holder, the one by the other; as and for the purpose set forth.

14. In a carving-machine, a framework, a driving-shaft mounted therein, a longitudinally and rotarily movable work-holder, rotary spindles mounted in said framework on opposite sides of said holder, and in a frame containing the axis of said holder, cutters mounted on said spindle, adapted to cut laterally, gearing connecting said driving-shaft and adapted to rotate said spindles in opposite directions, means for advancing said spindles toward said work-holder, whereby said cutters are caused to penetrate the work endwise, means for maintaining said cutters in advanced position, a tracer carried by said holder, and a pattern adapted to be engaged by said tracer, whereby the rotary and longitudinal movements of said holder are governed the one by the other; as and for the purpose set forth.

In witness whereof I have hereunto set my hand this 13th day of November, 1895.

GEORGE W. HODGES.

Attest:
S. E. DARBY,
M. I. CAVANAGH.